May 17, 1938.  B. L. SNYDER  2,117,519
GRILLE GUARD FOR AUTOMOBILES
Filed Dec. 30, 1936

Inventor:
Benjamin L. Snyder,
By Jas. C. Hobensmith
Attorney.

Patented May 17, 1938

2,117,519

UNITED STATES PATENT OFFICE 2,117,519

GRILLE GUARD FOR AUTOMOBILES

Benjamin L. Snyder, Philadelphia, Pa.

Application December 30, 1936, Serial No. 118,176

7 Claims. (Cl. 293—55)

This invention relates to grille guards for automobiles and more particularly to structure to be secured to the front bumper of an automobile for the purpose of protecting the radiator grille.

The automobiles now being sold on the market usually are provided with a grille in front of the radiator of the cooling system and as usually constructed these grilles are not suited to withstand severe shocks or impacts. As a result, upon the occurrence of an impact therewith, or of a slight collision, the grille may be twisted to an extent which seriously impairs the appearance of the automobile or may be twisted and bent beyond repair.

The bumpers of automobiles are not all set at the same height from the ground, so that when an automobile with a bumper in a lower position becomes involved in a slight rear end collision with a preceding car on which the rear bumper is set at a higher level, the rear bumper of the preceding car will sometimes ride over the top of the front bumper of the following car, and damage the front end thereof, particularly the relatively light grille, and sometimes the front mud guards or wheel fenders.

It is an object of the present invention to provide a guard which will furnish suitable protection to the front portion of the car, and particularly the radiator grille, and which will improve the appearance of the front portion of the vehicle.

It is also an object of the present invention to provide a grille guard which will be simple in construction, sturdy, easily applied, and when applied will remain in shock resisting position.

Other objects of the invention will appear from the annexed specification and claims.

The nature and characteristic features of the invention will be more readily understood from the following description taken in connection with the accompanying drawing forming part hereof in which.

Figure 1:
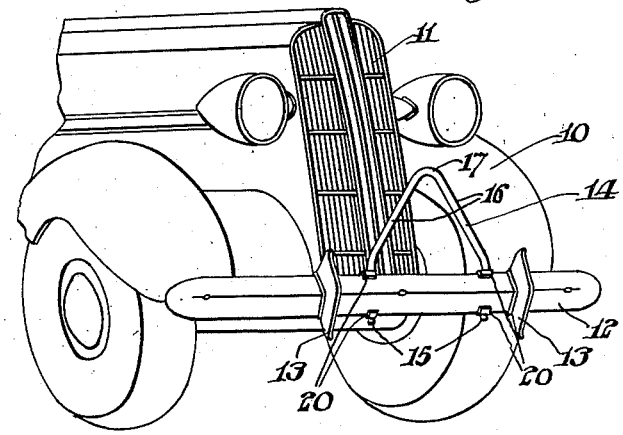
Figure 1 is a view in perspective of the front portion of an automotive vehicle, with a grille guard of the present invention mounted thereon.

It will, of course, be understood that the drawing and description herein contained are illustrative merely, and that various modifications and changes may be made in the structure disclosed without departing from the spirit of the invention.

Referring more particularly to the drawing, in which a preferred embodiment of the invention is shown, the front portion of an automotive vehicle is illustrated generally at 10, and may be of any make or design, with a grille, shell or similar structure 11 in front of and concealing the cellular or tubular radiator honeycomb. The present invention is not confined to automobiles having grilles but is capable of broader application as will hereinafter appear.

The front end of the vehicle 10 is provided with the usual vertical bumper 12, of any desired form or shape and mounted on or carried by the vehicle in any preferred manner. The bumper 12 may have suitably spaced auxiliary fenders 13 thereon.

The guard of the present invention is preferably mounted centrally of the bumper 12, and includes a guard bar 14 which extends upwardly therefrom in such a manner as to shield the grille 11, and protect this portion of the car, without, however, preventing access to the front of the automobile when necessary for cranking, refilling the radiator and similar operations.

This guard bar 14 may be made in any desired cross section but is preferably constructed as shown of a single piece of circular bar stock. The guard bar 14 is suitably shaped and preferably includes parallel vertically extending lower portions 15 for attachment to the bumper 12.

The guard bar 14 also preferably includes an inverted V-shaped portion, composed of inclined portions 16, and an apex portion 17 joining the inclined portions 16. The guard bar 14 is made in a single piece to insure rigidity and obtain the desired simplicity of construction and appearance.

Figure 2:
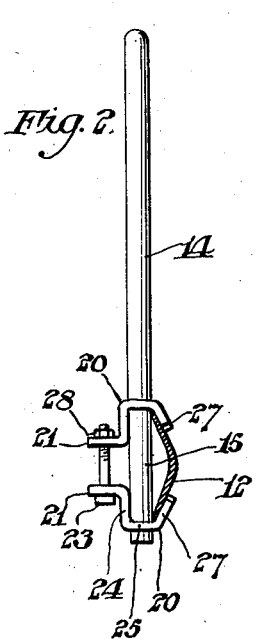
Fig. 2 is a vertical sectional view taken perpendicularly to the longitudinal axis of the automobile bumper and showing the manner of attachment of the grille guard to the bumper.
Figure 3:
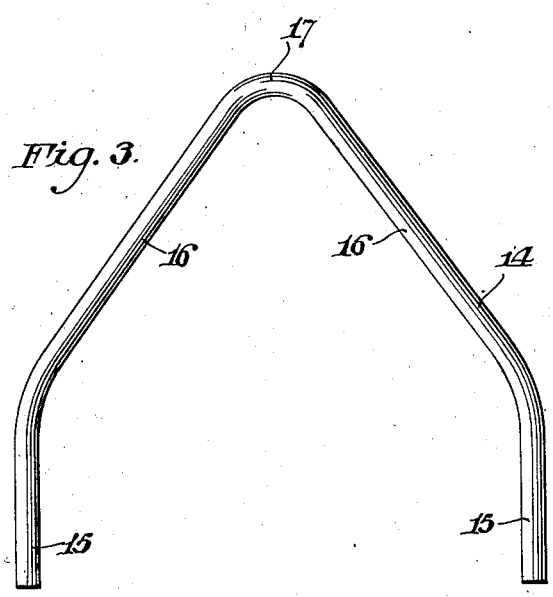
Fig. 3 is a front elevational view of the guard bar forming part of the present invention detached from the bumper.
Figure 4:
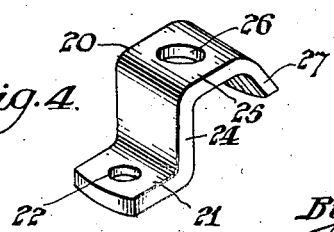
Fig. 4 is a view in perspective of a preferred form of guard bar clamp.

Clamping means are provided for holding the guard bar 14 in firm and fixed engagement with the vertical bumper 12 and for this purpose brackets, as at 20, have been found suitable. One of these brackets is shown in detail in Fig. 4 and, upon reference thereto, will be seen to comprise a horizontal portion 21 which is provided with an aperture 22 through which a bolt 23 may be placed, a vertical portion 24, and a horizontal portion 25 with an aperture 26 through which one of the portions 15 of the guard bar 14 is adapted to extend. The bracket also has an inclined portion 27 for engagement with the bumper 12 as indicated in Fig. 2. Two of these brackets 20, as shown in Fig. 2, are oppositely disposed and the bolt 23 is passed through the apertures 22 provided in the portions 21 in the brackets 20. A nut 28 is provided on the bolt 23 for tightening the clamps 20 into firm engagement with the upper and lower edges of the bumper 12, so that the edges of the bumper are wedged between the guard bar 14 and the inner face of the inclined portion 27 while at the same time the guard bar 14 is gripped at the place of engagement in the apertures 26.

The character of protection afforded by the guard will be evident from Fig. 1, although the apex portion 17 also permits of the guard being used as a towing attachment by engagement therewith of one of the well known types of hooks (not shown) which are used with towing cranes (not shown).

I claim:

1. An auxiliary guard for an automobile and attached to the bumper thereof, said guard comprising a single, rigid, integral bar having a V-shaped portion with the apex disposed upwardly and also having end portions extending vertically downward from the ends of the legs of the V-shaped portion, and clamping devices which simultaneously grip the upper and lower edge portions of the bumper and said vertically extending portions for vertically adjustably securing the guard to the bumper.

2. An auxiliary guard for an automobile and attached to the bumper thereof, said guard comprising a single, rigid, integral bar, said bar being round in cross section and having a V-shaped portion with the apex disposed upwardly and also having end portions extending vertically downward from the ends of the legs of the V-shaped portion, and clamping devices through which said vertically extending portions extend and which simultaneously grip the bumper and said vertically extending portions for adjustably securing the guard to the bumper.

3. The combination with the bumper of an automobile of an auxiliary guard, said guard comprising a unitary bar round in cross section extending upwardly from the bumper at the central portion thereof and having spaced end portions extending vertically downward past said bumper, and pairs of clamping devices in engagement with each of said end portions of the bar, one each of said pairs engaging the upper edge portion of the bumper and the others of each of said pairs engaging the lower edge portion of the bumper.

4. The combination with the bumper of an automobile of an auxiliary guard for the automobile, said guard comprising an inverted V-shaped bar extending upwardly from the bumper at the central portion thereof and having spaced end portions extending vertically downward past said bumper, and clamping devices for securing said bar to said bumper, said devices including a pair of angular pieces for each of said end portions of the bar, each of said angular pieces having an aperture therethrough through which one of said end portions extends, one of said angular pieces engaging the upper edge portion of the bumper and another engaging the lower edge portion of the bumper, and a bolt member for each pair of angular pieces for holding said pieces in gripping relationship with said bar and bumper.

5. The combination with the bumper of an automobile of a grille guard, said grille guard comprising a one piece inverted V-shaped bar extending upwardly from the bumper at the central portion thereof and having spaced downwardly extending end portions, and clamping devices for securing said end portions of the bar to said bumper, each of said clamping devices having a horizontal portion with an aperture therethrough through which one of said end portions extends vertically and an inclined portion in engagement with said bumper for gripping said bumper and holding said bar in fixed relation to said bumper, said clamping devices also having extended portions, and a bolt member extending through said extended portions for drawing said clamping devices into engagement with said bumper and said end portions.

6. An auxiliary guard for an automobile and attached to the bumper thereof, said guard comprising a single, rigid, integral bar having a portion disposed upwardly and also having end portions extending vertically downward, and clamping devices which simultaneously grip the upper and lower edge portions of the bumper and said vertically extending portions for vertically adjustably securing the guard to the bumper.

7. An auxiliary guard for an automobile and attached to the bumper thereof, said guard comprising a single rigid integral member having a portion disposed upwardly and above the bumper and also having spaced end portions extending vertically downward, and clamping devices which simultaneously grip the upper and lower edge portions of the bumper and said vertically extending portions for securing the guard to the bumper.

BENJAMIN L. SNYDER.